US005131363A

United States Patent [19]

Ganser

[11] Patent Number: 5,131,363

[45] Date of Patent: Jul. 21, 1992

[54] SETTING ELEMENT AS WELL AS THROTTLE VALVE CONNECTION HAVING SUCH AN ELEMENT

[75] Inventor: Otmar Ganser, Frankfurt am Main, Fed. Rep. of Germany

[73] Assignee: VDO Adolf Schindling AG, Frankfurt am Main, Fed. Rep. of Germany

[21] Appl. No.: 726,307

[22] Filed: Jul. 5, 1991

[30] Foreign Application Priority Data

Sep. 13, 1990 [DE] Fed. Rep. of Germany ....... 4029002

[51] Int. Cl.[5] ........................ F16B 1/00; F02M 19/12; F02D 9/08

[52] U.S. Cl. ................................ 123/398; 74/571 M; 123/400

[58] Field of Search ............... 123/339, 361, 396, 398, 123/399, 400; 74/571 M

[56] References Cited

U.S. PATENT DOCUMENTS

| | | | |
|---|---|---|---|
| 4,342,477 | 8/1982 | McClure | 292/307 R |
| 4,425,886 | 1/1984 | Kuriowa et al. | 123/339 |

FOREIGN PATENT DOCUMENTS

| | | |
|---|---|---|
| 1800919 | 7/1970 | Fed. Rep. of Germany . |
| 2049765 | 4/1971 | Fed. Rep. of Germany . |
| 3738409 | 5/1989 | Fed. Rep. of Germany . |

*Primary Examiner*—Tony M. Argenbright
*Attorney, Agent, or Firm*—Martin A. Farber

[57] ABSTRACT

A setting element (9) has, as handle (18), a web which is connected via a place of intended breakage (19) to the rest of the setting element (9). As setting part (17) there is provided an eccentric which effects the required setting movement by the turning of the setting element (9). After a desired setting has been reached, the handle (18) is broken off, thereby preventing further manipulation of the setting element (9).

7 Claims, 1 Drawing Sheet

SETTING ELEMENT AS WELL AS THROTTLE VALVE CONNECTION HAVING SUCH AN ELEMENT

FIELD AND BACKGROUND OF THE INVENTION

The invention relates to a setting element having a handle for turning or displacing a setting part of the setting element, such as may be used in the control of fuel feeding to an internal combustion engine. The invention also relates to a throttle valve connection to such engine and having such a setting element, including use of a carburetor.

It is frequently desired in the case of setting elements to prevent further manipulation after an initial setting has been effected. Such setting elements also serve to compensate for manufacturing tolerances. It is known to fix setting elements in position after they have been actuated by use of an adhesive or by deformation by means of a punch. These fixing means do not, however, exclude undesired actuation since they will release the setting element if a sufficiently large force is applied. Another disadvantage of the known securing devices for setting elements is that they require considerable expense and frequently result in the exertion of a force which leads to damage of the part having the setting element which is to be locked.

SUMMARY OF THE INVENTION

It is an object of the invention so to develop a setting element of the aforementioned type that, once its setting has been effected, it can be dependably secured, in a particularly simple manner against further displacement. A throttle valve connection having such a setting element is furthermore to be created.

According to the invention, a handle (18) is formed on the setting element (9), the handle being attached to the setting element (19) by a connection which can be broken off at a place of intended breakage (19).

The handle of such a setting element can be simply broken off after the setting has been effected, thus reliably preventing any subsequent displacement of the setting element. The setting element of the invention can be displaced and secured against subsequent displacement without the use of any tool. It is of very simple development and therefore can be manufactured at little expense. There is also the advantage that the securing of the setting element by the breaking off of its handle does not require any great application of force or thermal action which might lead to damage to structural parts.

The handle (18) is particularly simple if it consists of a web formed on the outer side of the setting element (9).

The setting element can, as a whole, be developed very simply if it is developed for rotatable mounting in a housing (1) and if the setting part (17) is an eccentric.

The second object, namely the creation of a throttle-valve connection with a setting element which can be locked in simple manner is achieved in accordance with the invention as follows.

There is provided a throttle valve connection to a throttle valve which is urged in closing direction by a leg of a return spring, the connection having a setting element for limiting the return motion of the leg arranged in such a position as to obtain an opening of the throttle valve which corresponds to emergency travel control. A handle (18) is formed on the setting element (9), the handle being attached to the setting element (9) in such a manner that it can be broken off from it at a place of intended breakage (19).

In such a throttle-valve connection, the emergency travel speed can be set in simple manner by the setting element in order to compensate for manufacturing tolerances, without the use of any tool. By the breaking off of the handle, subsequent displacement of the emergency travel speed setting is made impossible. These advantages are obtained at very little structural expense as a result of the development of the setting element in accordance with the invention. The securing of the setting element does not require the exertion of any great amount of force which could lead to damaging structural parts of the throttle-valve connection.

The throttle-valve connection is of particularly simple construction if the setting element (9) is an eccentric which is arranged for rotation within a housing cover.

The handle is of very simple development and can easily be broken off when the setting element (9) has as handle (18) a web developed transversely on the outer end surface.

In accordance with one further advantageous development of the invention, the setting member (9) can be held in the housing cover together with a return spring (7). In this way there is obtained a mounting unit which can be manufactured at little cost and can easily be mounted as a unit on the throttle-valve connection.

BRIEF DESCRIPTION OF THE DRAWING

With the above and other objects and advantages in view, the present invention will become more clearly understood in connection with the detailed description of the preferred embodiment, when considered with the accompanying drawing, of which.

DETAILED DESCRIPTION OF THE PREFERRED EMBODIMENT

Figure 1:
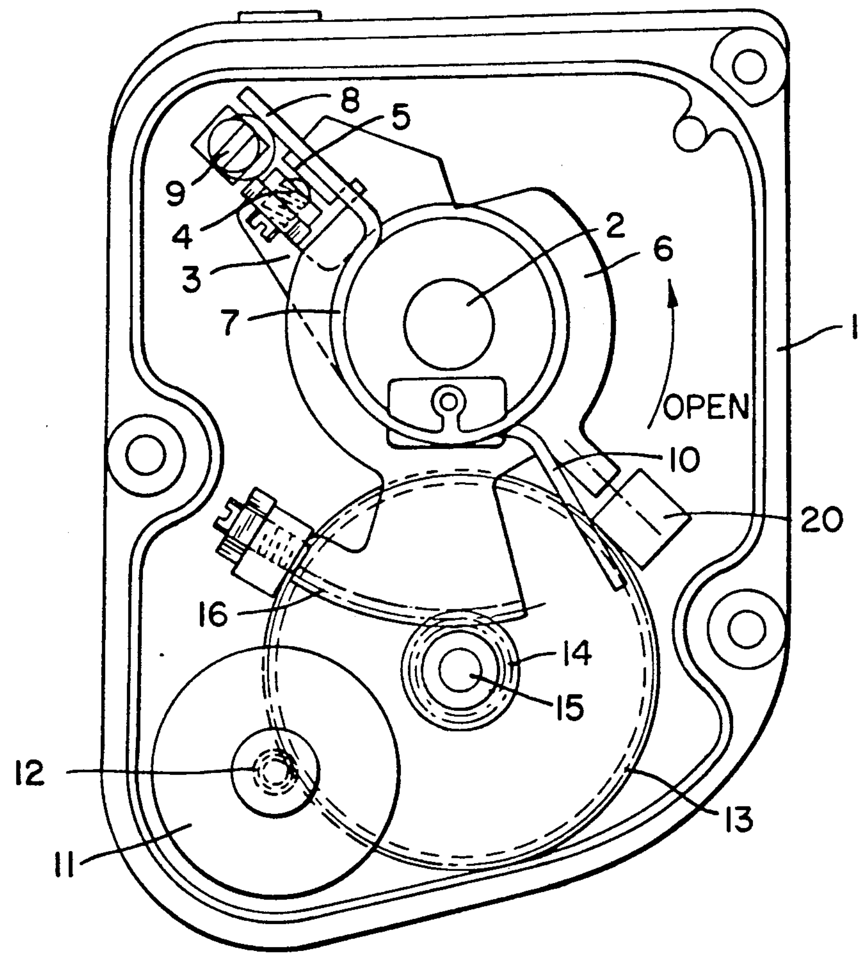
FIG. 1 is a view into a motor-driven setting device of a throttle valve having the setting element of the invention.

FIG. 1 shows a housing 1 in which a throttle-valve shaft 2 is rotatably mounted. There is fixed on the throttle-valve shaft 2 an actuating arm 3 which, via an adjustable stop 4, rests, as seen in FIG. 1, from the left against a bend 5 of a toothed segment 6 mounted on the throttle valve shaft 2. This toothed segment 6 is held by a return spring 7 in the position shown in the drawing, in which the throttle valve (not shown) is in emergency travel position. For this purpose the return spring 7 has one leg 8 resting against a setting element 9 which may be fastened in the housing 1 or in a housing cover (not shown). The other leg 10 of the return spring 7 rests against a stop 20 which is fastened to the housing.

The toothed segment 6 is so coupled with the throttle-valve shaft 2 that it opens the throttle valve upon swinging in counter-clockwise direction and upon a return movement moves the throttle valve in the closing direction until the position shown in the drawing is reached. It is thus possible to swing, by free travel, the actuating arm 3 for idle adjustment further in clockwise direction and thereby close the throttle valve down to a minimum idling position.

For the actuation by motor of the throttle-valve shaft 2 there is employed a setting motor 11 which, via a pinion 12, drives a gear 13 which is seated together with a pinion 14 on a shaft 15. The pinion 4 engages in a toothing 16 of the toothed segment 6.

Figure 2:
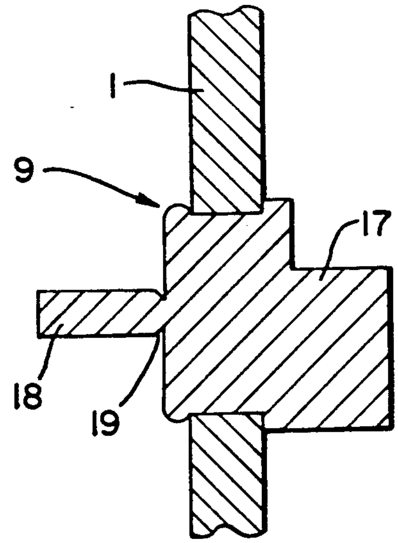
FIG. 2 is a longitudinal section through the setting element, shown on a larger scale than in FIG. 1.
Figure 3:
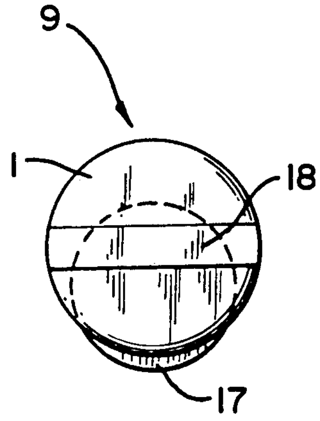
FIG. 3 is a view of the end of the setting element.

The development of the setting element 9 which is shown in FIGS. 2 and 3 is of importance for the invention. As shown in FIG. 2, the setting element 9 is arranged turnably in the housing 1. It has a setting part 17 which consists of an eccentric against the outer surface of which the leg 8 of the return spring 7, shown in FIG. 1, rests. For the turning of the setting element 9 there is a handle 18 which is provided as a narrow web on the end surface of the setting element 9 and is connected with the end surface of the setting element 9 via a place of intended breakage 19.

FIG. 3 shows the arrangement of the setting part 7, which is developed as eccentric, and of the handle 18 which extends as a web transversely over the setting element 9.

In order to set the emergency travel position with the throttle valve suitably open for this, the setting element 9 is turned by hand, without the use of a tool, by means of the handle 18. When the correct setting has been reached, the handle 18 can be broken off manually at the place of intended breakage 19, thereby preventing subsequent displacement of the setting element 9.

I claim:

1. A setting element comprising a setting part, and a handle for turning or displacing the setting part;

a break-away connection;

wherein the handle is attached to the setting element by the break-away connection, and the connection can be broken off at a place of intended breakage; and the setting element is operative with a housing, and is developed for rotatable mounting in the housing, the setting part being an eccentric.

2. A setting element according to claim 1, wherein the handle comprises a web formed on an outer side of the setting element.

3. A throttle valve system comprising a return spring and a setting element;

a throttle valve which is urged in closing direction by a leg of the return spring, the setting element serving to limit a return motion of said leg and being arranged in a position which provides an opening of the throttle valve for an emergency travel control;

a handle extending from the setting element, and a break-away connection; and wherein the handle is attached to the setting element by the connection to allow the handle to be broken off from the setting element at a place of intended breakage.

4. A system according to claim 3, wherein the setting element is operative with a housing cover, and comprises an eccentric which is arranged for rotation within the housing cover.

5. A system according to claim 4, wherein the handle comprises a web developed transversely on an outer end surface of the setting element.

6. A system according to claim 3, wherein the handle comprises a web developed transversely on an outer end surface of the setting element.

7. A system according to claim 4, wherein the setting member is held in the housing cover together with the return spring.

* * * * *